US007050486B2

(12) United States Patent
Yasaki

(10) Patent No.: US 7,050,486 B2
(45) Date of Patent: May 23, 2006

(54) PATH SEARCHER FOR SPREAD SPECTRUM RECEIVER

(75) Inventor: Takahiro Yasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 09/991,697

(22) Filed: Nov. 26, 2001

(65) Prior Publication Data

US 2002/0064215 A1     May 30, 2002

(30) Foreign Application Priority Data

Nov. 24, 2000    (JP)   ............................ 2000-357782

(51) Int. Cl.
     *H04B 1/69*      (2006.01)
(52) U.S. Cl. ...................... 375/150; 375/147; 375/142; 375/130; 375/148; 342/357.12
(58) Field of Classification Search ................ 375/150, 375/147, 142, 130, 148; 342/357.12
See application file for complete search history.

(56) References Cited

U.S. PATENT DOCUMENTS

| 4,660,164 | A | | 4/1987 | Leibowitz |
| 5,511,015 | A | | 4/1996 | Flockencier |
| 5,901,171 | A | * | 5/1999 | Kohli et al. ................. 375/147 |
| 6,044,104 | A | * | 3/2000 | Watanabe .................... 375/142 |
| 6,208,291 | B1 | * | 3/2001 | Krasner .................. 342/357.12 |
| 6,532,251 | B1 | * | 3/2003 | King et al. .................. 375/142 |
| 6,678,313 | B1 | * | 1/2004 | Imaizumi et al. ........... 375/150 |
| 6,693,951 | B1 | * | 2/2004 | Gilhousen et al. .......... 375/130 |
| 6,700,925 | B1 | * | 3/2004 | Ohnishi ....................... 375/150 |
| 6,813,309 | B1 | * | 11/2004 | Ogino ......................... 375/148 |

FOREIGN PATENT DOCUMENTS

| JP | 5-53912 A | 3/1993 |
| JP | 9-223118 A | 8/1997 |
| JP | 11-39207 A | 2/1999 |
| JP | 11-353232 A | 12/1999 |
| JP | 2000-22665 A | 1/2000 |
| JP | 2000-115025 A | 4/2000 |
| JP | 2000-138651 | * 5/2000 |
| JP | 2000-188587 A | 7/2000 |
| JP | 2000-209124 | * 7/2000 |
| JP | 2000-209124 A | 7/2000 |
| JP | 2000-244331 A | 9/2000 |
| JP | 2000-244367 A | 9/2000 |
| JP | 2000-307479 A | 11/2000 |
| WO | WO 99/63677 A1 | 12/1999 |

* cited by examiner

*Primary Examiner*—Stephen Chin
*Assistant Examiner*—Sudhanshu C. Pathak
(74) *Attorney, Agent, or Firm*—Sughrue Mion, PLLC

(57) ABSTRACT

A path searcher of a spread spectrum receiver includes a number of correlators each of which produces a replica of a scrambled synchronization code and determines a correlation between the replica and a received spread spectrum signal. Each of the correlators performs a correlation operation between the received spread spectrum signal and the replica at a rate higher than a chip rate of the spread spectrum signal by successively shifting the replica with respect to the spread spectrum signal.

3 Claims, 11 Drawing Sheets

FIG. 9

| | Q0 | | | | Q1 | | | | Q15 | | |
|---|---|---|---|---|---|---|---|---|---|---|---|
| | S0 | S1 | --- | S15 | S0 | S1 | --- | S15 | S0 | S1 | --- | S15 |
| T0 | x #1 | x #1 | --- | x #1 | x #2 | x #2 | --- | x #2 | x #16 | x #16 | --- | x #16 |
| T1 | x #2 | x #2 | --- | x #2 | x #3 | x #3 | --- | x #3 | x #17 | x #17 | --- | x #17 |
| --- | --- | --- | --- | --- | --- | --- | --- | --- | --- | --- | --- | --- |
| T15 | x #16 | x #16 | --- | x #16 | x #17 | x #17 | --- | x #17 | x #31 | x #31 | --- | x #31 |

PATH SEARCHER FOR SPREAD SPECTRUM RECEIVER

BACKGROUND OF THE INVENTION

1. Field of the Invention

The present invention relates generally to spread spectrum (CDMA) communication systems and more specifically to a path searcher for use in a spread spectrum receiver for detecting delay characteristics of a plurality of communication paths for a diversity demodulator such as RAKE demodulator by taking correlation between a replica of a scrambled synchronization code and a received spread spectrum signal.

2. Description of the Related Art

Diversity combining is a well known technique in the art of spread spectrum systems to achieve gain of a received signal by combining component signals of different communication paths. This is achieved by the knowledge of individual path delays. In order to determine the individual path delays, a scrambled synchronization code is transmitted as a timing message. At the receiving site, the sync code is detected by taking correlation between the received signal and a replica of the scrambled sync code. Correlation values of the individual communication paths represent their delay characteristics. Since the correlation values must be obtained on a chip-by-chip basis, the amount of computations is significant and places a heavy burden on hardware. For example, if the scrambled sync code has "P" symbols and the number of chips per symbol is "S", and correlation is taken at "T" points, multiplying and summing operations must be performed "P×S×T" times for detecting a sync code.

In a prior art base station receiver of spread spectrum communication network, the correlation technique requires the use of T correlators for each mobile user, with a total number of m×T correlators for each base station.

A technique is known to reduce this number by storing a P×T chip length of a received spread spectrum signal in a memory and repeatedly reading the stored data for correlation. However, a high capacity memory is required to hold this amount of information.

SUMMARY OF INVENTION

It is therefore an object of the present invention to provide a path searcher for a spread spectrum receiver which requires a smaller number of correlators.

According to a first aspect of the present invention, there is provided a path searcher for a spread spectrum receiver for receiving a spread spectrum signal containing a scrambled synchronization code, wherein the receiver includes a plurality of correlators and each correlator produces a replica of the scrambled synchronization code and determines a correlation value between the replica and the received spread spectrum signal. The present invention is characterized in that each of the correlators performs a correlation operation between the received spread spectrum signal and the replica at a rate higher than a chip rate of the spread spectrum signal by successively shifting the replica with respect to the spread spectrum signal.

According to a second aspect, the present invention provides a path searcher for a spread spectrum receiver for receiving a spread spectrum signal, wherein the receiver includes a plurality of correlators, and each of the correlators produces a replica of a scrambled synchronization code and determines a correlation value between the replica and the received spread spectrum signal. The invention is characterized by a first memory for storing the received spread spectrum signal. Each of the correlators reads the stored spread spectrum signal from the first memory at a rate higher than a chip rate of the received spread spectrum signal, repeatedly performs a correlation operation between the read spread spectrum signal and the replica at the higher rate by successively shifting the replica with respect to the stored spread spectrum signal. A second memory is provided for initially storing an intermediate result of a correlation value from each of the correlators and subsequently reading the stored intermediate result into a corresponding one of the correlators. Each of the correlators adds the intermediate result from the second memory with a correlation value produced by the correlation operation performed at the end of the chip interval.

BRIEF DESCRIPTION OF THE DRAWINGS

The present invention will be described in detail further with reference to the following drawings, in which:

FIG. 9 is an illustration of results of multiplications of FIG. 8;

DETAILED DESCRIPTION

Figure 1:
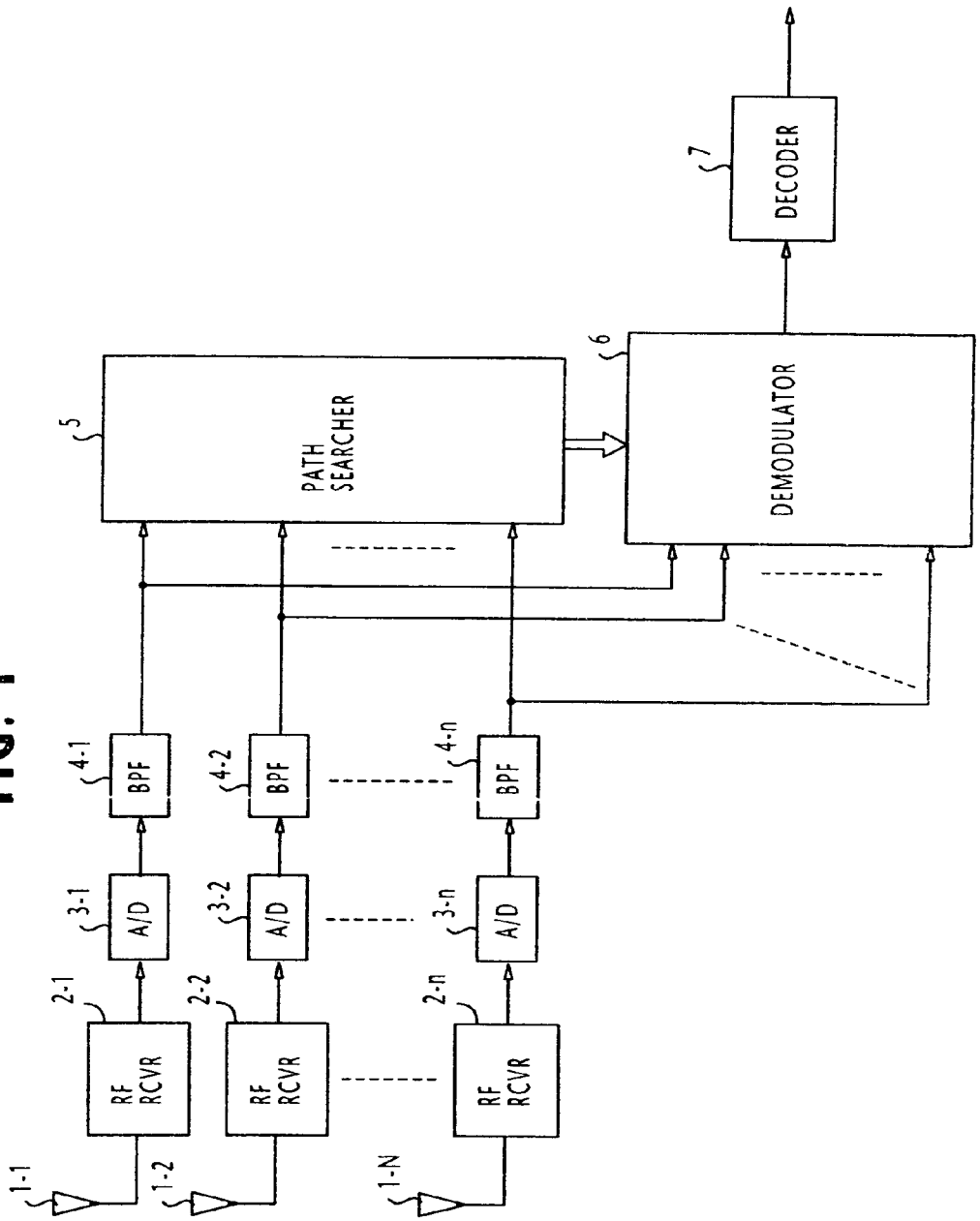
FIG. 1 is a block diagram of a spread spectrum receiver incorporating a path searcher of the present invention.

Referring to FIG. 1, a spread spectrum receiver according to the present invention is comprised of N antenna systems or diversity branches each including an antenna 1 for receiving a spread spectrum signal propagated over a multipath fading channel, an RF receiver or down-converter 2 for down-converting the received signal, an A/D converter 3 for converting the down-converted signal to digital form, and a band-pass filter 4 for limiting the frequencies of the digital signal to a predetermined bandwidth.

For purposes of disclosure, it is assumed that the spread spectrum receiver of the present invention is located in a base station of a mobile communication system. Mobile stations are each assigned a unique scramble code which is multiplied by a channelization code to produce a spreading code. The spreading code is used to scramble the information-bearing signal of a mobile station and transmitted on a forward channel to the base station. A synchronization code is scrambled with the spreading code and transmitted on the forward channel to allow the base station to establish synchronization.

The outputs of the N diversity branches are supplied to a path searcher 5 and a demodulator 6. Path searcher 5 produces correlation values of multiple communication paths from the transmitter to the respective antennas 1 in a manner as will be described later. Demodulator 6 has a number of RAKE fingers corresponding to the diversity branches to demodulate their output signals by using the correlation values. A decoder 7 provides an error correction and decoding process on the demodulated signal.

Figure 2:
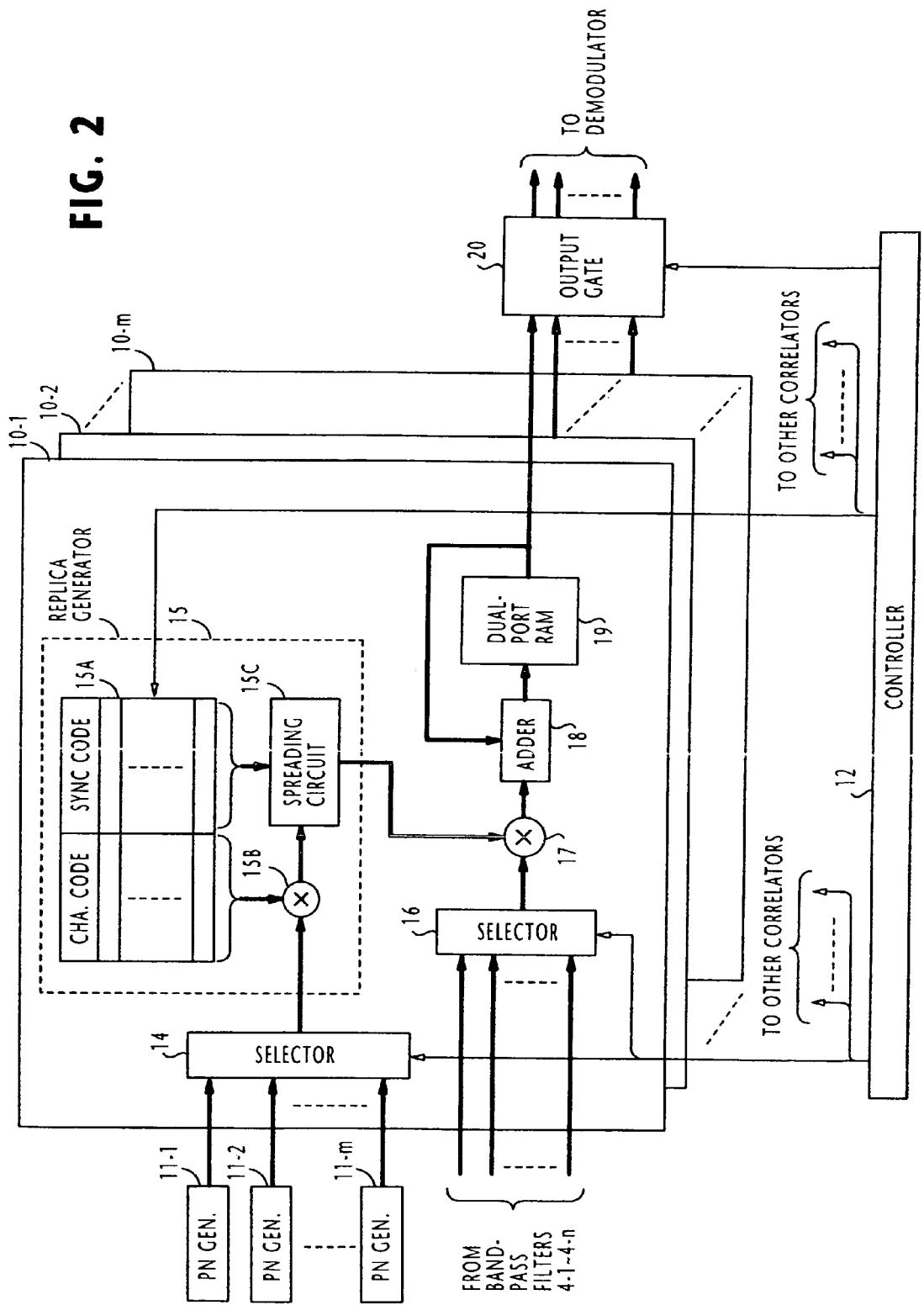
FIG. 2 is a block diagram of the path searcher according to a first embodiment of the present invention.

As shown in FIG. 2, the path searcher 5 of a first embodiment of the present invention includes a plurality of identical correlators 10-1~10-m, which are provided in number corresponding to the number of mobile users. If correlation values are determined at "T" points for each of "m" users, the number of correlators 10 is given by T×m/Q where Q is the number of times by which each correlator must repeat correlation operations between scrambled signals. If the chip rate of the spread spectrum signal is 3.84 MHz and the operating speed of the correlators is 61.44 MHz, the integer "Q" is equal to 16. If T=Q, the number of correlators 10 is equal to the number of mobile users. Otherwise, the number of correlators 10 increases depending on the number T of correlation points. As long as the integer T is not much greater than the integer Q, the number of correlators required to produce sufficient amount of delay information is significantly smaller than what is required in the prior art. It will be seen that by increasing the calculation speed of the correlators with respect to the chip rate of the spread spectrum signal, the number of correlators can be decreased.

A plurality of PN (pseudonoise) generators 11-1~11-m are provided for m users' scrambling codes. A controller 12 provides overall timing and selecting functions of the correlators.

Each correlator 10 is comprised of a selector 14 that uses a control signal from the controller 12 to select one of the scrambling codes corresponding to a user and supplies a replica generator 15 with the selected scrambling code. Replica generator 15 includes a mapping table 15A in which synchronization codes are mapped to channelization codes. One of the channelization codes and the corresponding sync code are selected from the mapping table 15A by the controller 12 corresponding to a received spread spectrum signal. The selected channelization code is supplied to a multiplier circuit 15B, where it is multiplied by the scrambling code from the selected PN generator to produce a spreading code which is identical to that used by the mobile user. Since the received spread spectrum signal contains a scrambled sync code, the spreading code used in the forward channel is reproduced in this way. The reproduced spreading code is then used by the spreading circuit 15C for scrambling the selected sync code to produce a replica of the transmitted scrambled sync code.

The output signals of the band-pass filters 4 are applied to a selector 16 and one of these is selected by the controller 12 and supplied to a multiplier 17. In the multiplier 17 a correlation operation is repeatedly performed between the replica and the output signal of the selected band-pass filter 4 at a rate higher than the chip rate of the received spread spectrum signal.

Figure 3:
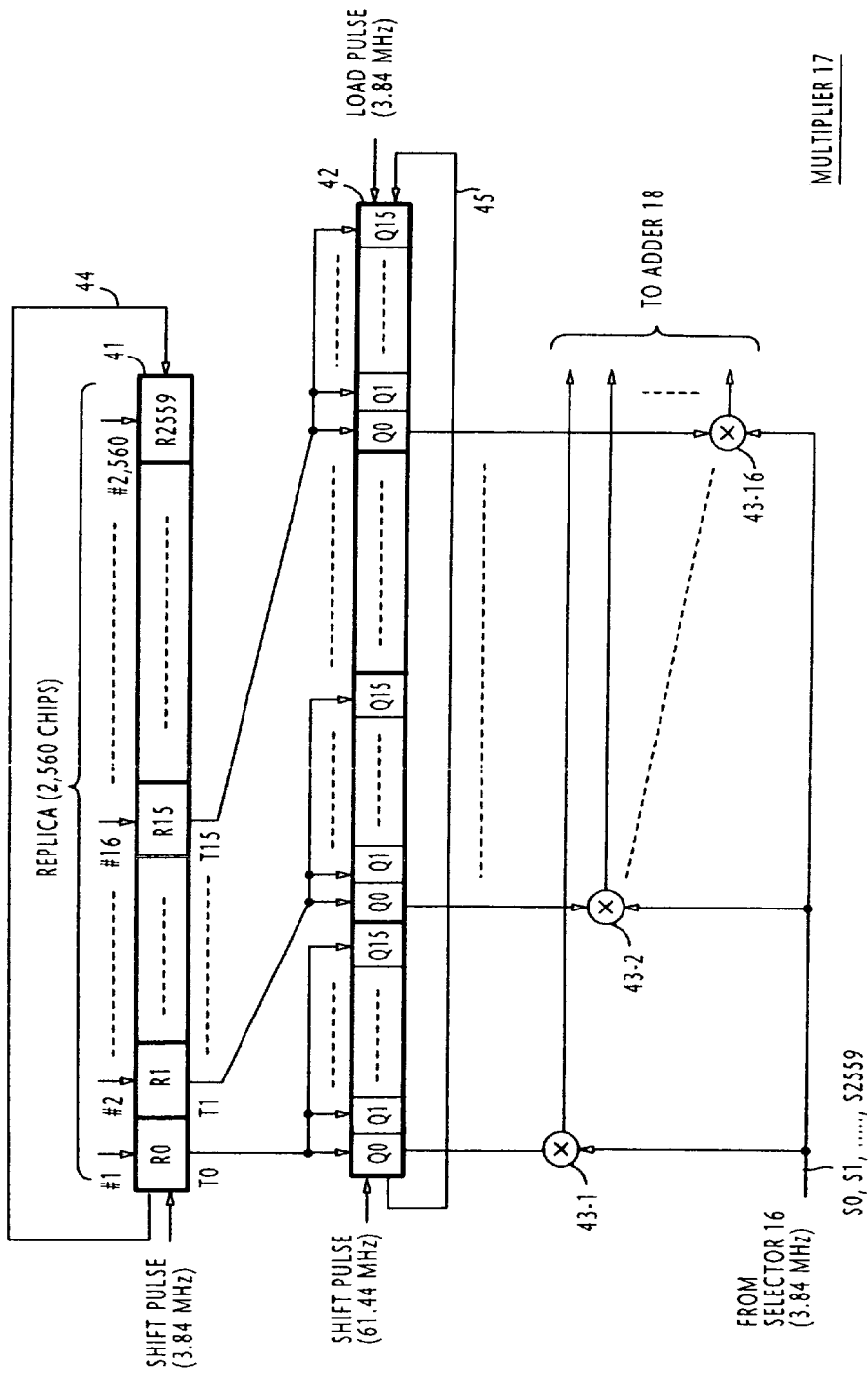
FIG. 3 is a block diagram of the multiplier of FIG. 2.

As shown in detail in FIG. 3, the multiplier 17 includes shift registers 41 and 42. If the scrambled sync code has 2,560 chips and the number (T) of correlation points is 16, the shift register 41 has 2,560 stages for loading the scrambled sync code from the spreading circuit 15C and is driven at the chip rate 3.84 MHz for shifting and recirculating the stored chips through a recirculating path 44. Shift register 42 has T×Q (256=16×16) stages which are divided into sixteen sets of sixteen stages Q0 to Q15 and all Q0 to Q15 stages of each set are connected to the R0 to R15 stages of shift register, respectively. These register stages are also designated T0 to T15 stages since they correspond to the T=16 correlation points. Shift register 42 receives chip data from the T0 to T15 stages at the chip rate 3.84 in response to a load pulse applied thereto. As a result, each of sixteen chips on stages T0 to T15 of shift register 41 are copied as same sixteen chips on the Q0 to Q15 stages of shift register 42, with a total of 256 chips. In response to a shift pulse, the shift register 42 is driven at 61.44 MHz which is sixteen times higher than the chip rate for shifting and circulating the replicated chips through a recirculating path 45.

A plurality of multiplier units 43-1 to 43-16 are provided. First input terminals of these multiplier units 43 are connected to the sixteen Q0 stages of register 42 and their second input terminals are connected together to the output of selector 16 to receive a spread spectrum signal. For convenience, the spread spectrum signal is represented as a sequence of signal chips S0, S1, . . . , S2559. Each of these signal chips is applied to the multiplier units 43 for a math (or multiplication) with chips moving on the shift register 41. Therefore, for each signal chip, multiplication is repeatedly performed Q=16 times during a chip interval with a resolution of T=16 points on the replica's chip sequence.

While 256 chips of the replica are moving along the stages of register 42 at the rate of 61.44 MHz, the output signal of the selector 16 is supplied one chip at a time for a match with these chips to produce a plurality of multiplication values from the multiplier units 43-1 through 43-16.

Figure 4:
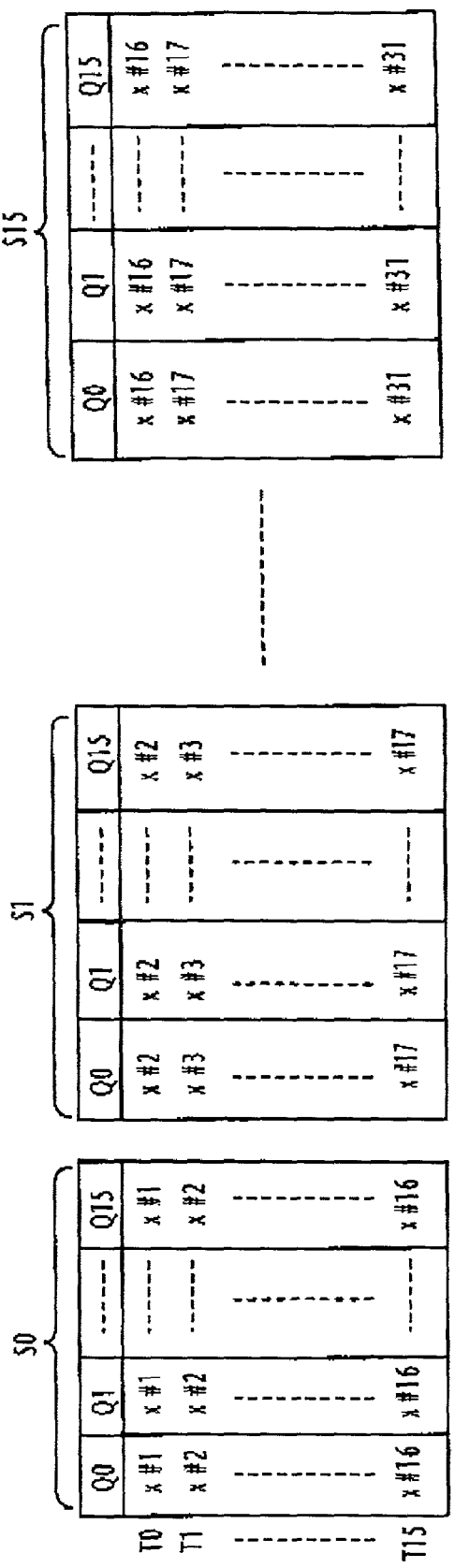
FIG. 4 is an illustration of results of multiplications of FIG. 3.
Figure 5:
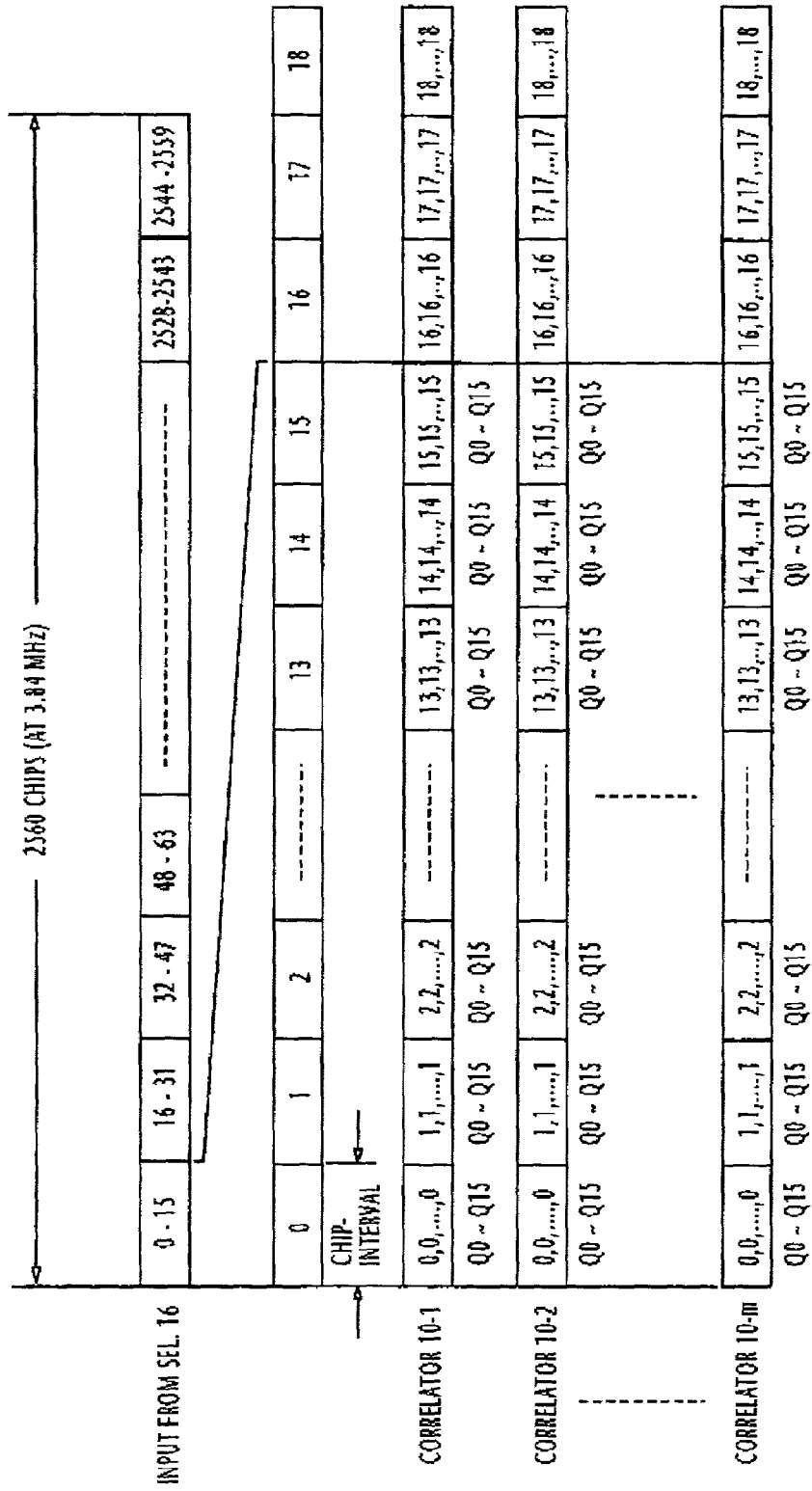
FIG. 5 is a timing diagram of the path searcher of FIG. 2.

The following is a description of one example of the multiplication process of FIG. 3 with reference to FIG. 4 by assuming that a sequence of signal chips S0 to 515 is supplied to the multiplier units 43 when replica chips #1 through #2,560 chips are stored in stages R0 through R2559, respectively. It is seen that the signal chip S0 is simultaneously multiplied by replica chips #1 to #16 of the R0 to R15 stages by repeatedly multiplying their 16 copies at Q0 to Q15 stages of register 42, producing 256 multiplication values. When signal chip S1 is applied, the shift register 41 is shifted by one chip position to the left, causing chips #2 through #17 to be loaded into the register 42. Signal chip S1 is therefore multiplied by copies of these chips at Q0 to Q15 stages of register 42, producing 256 multiplication values. The process is repeated on subsequent signal chips, producing a total of 4,096 multiplication values during a period of signal chips S0 to S15, as shown in FIG. 5.

Returning to FIG. 2, the output signals of multiplier 17 are supplied to an adder 18 where the multiplication values are summed and supplied to a is dual-port RAM 19 as intermediate results of a correlation value and stored therein an interval corresponding to each multiplication process and then read out of this memory as a previous value.

Figure 6:
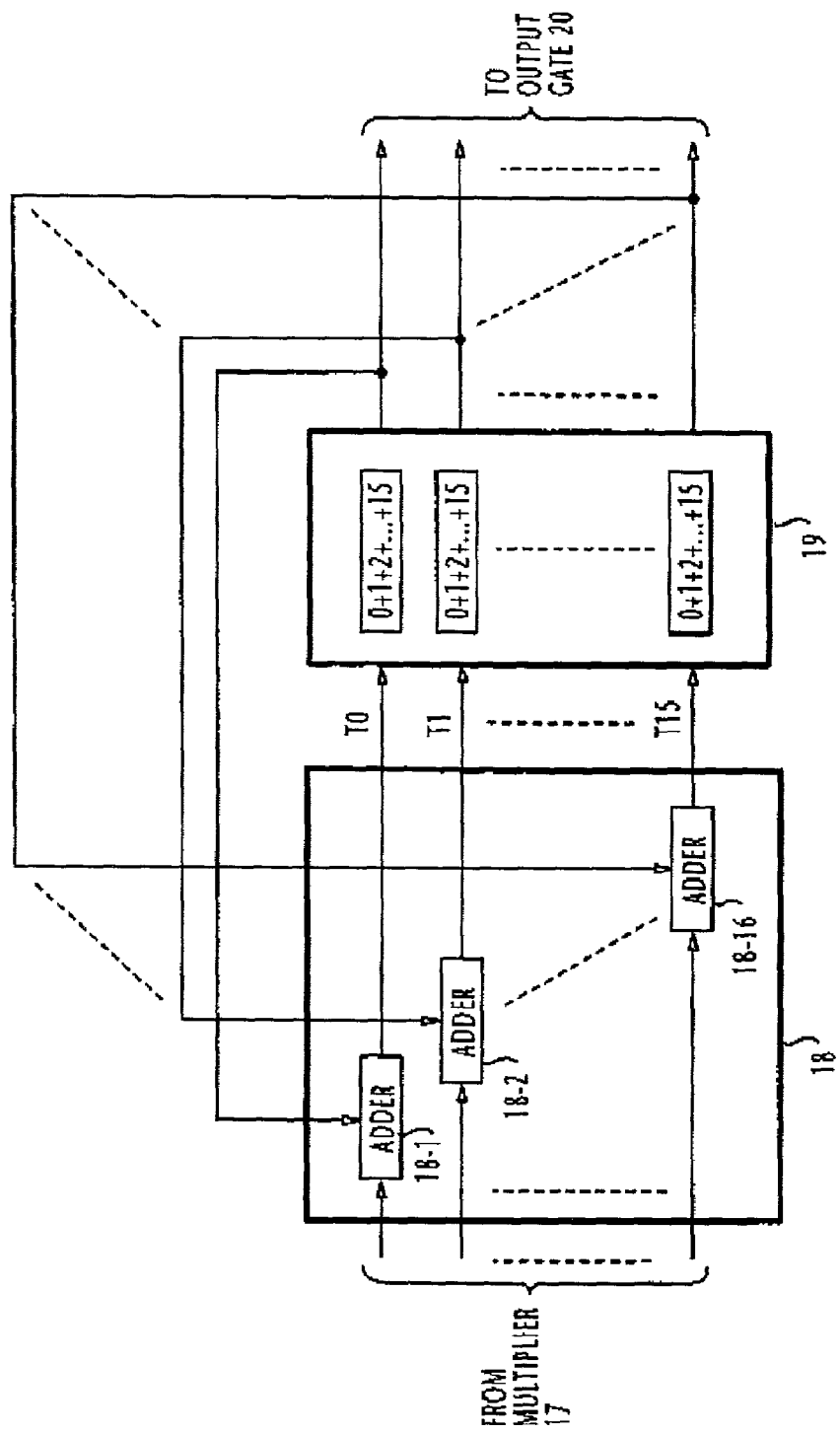
FIG. 6 is a block diagram of the adder of FIG. 2 and the associated memory.

As shown in detail in FIG. 6, the adder 18 includes a plurality of adder units 18-1 through 18-16 to which the output signals of multiplier 17 are respectively supplied. A set of output values of these adder units, which correspond to correlation points T0 to T15, are stored in respective storage locations of the memory 19. When a subsequent set of multiplication values are supplied to the adder units 18 from the multiplier 17, the memory is accessed to read its contents and feed them to the adder units so that the new multiplication values are summed with corresponding previous values in the adder units 18-1 through 18-16. The summed values are used to update the stored previous values of the memory 19. The process is repeated until multiply-and-add process is performed sixteen times for each chip interval, producing correlation values. The correlation values produced in this way from each correlator 10 are delivered through an output gate 20 to the demodulator 6.

Demodulator uses the correlation values as delay characteristics of the communication paths to control its RAKE fingers in a manner known in the art.

It is seen from the foregoing that the present invention obtains high definition path delay data with the use of a small number of correlators.

Since the dual-port RAM 19 must be accessed each time a multiply-and-add process is performed, a wide bandwidth is required for accessing this memory. It is desirable that the bandwidth of a memory be as narrow as possible by reducing the number of repeated accesses.

Figure 7:
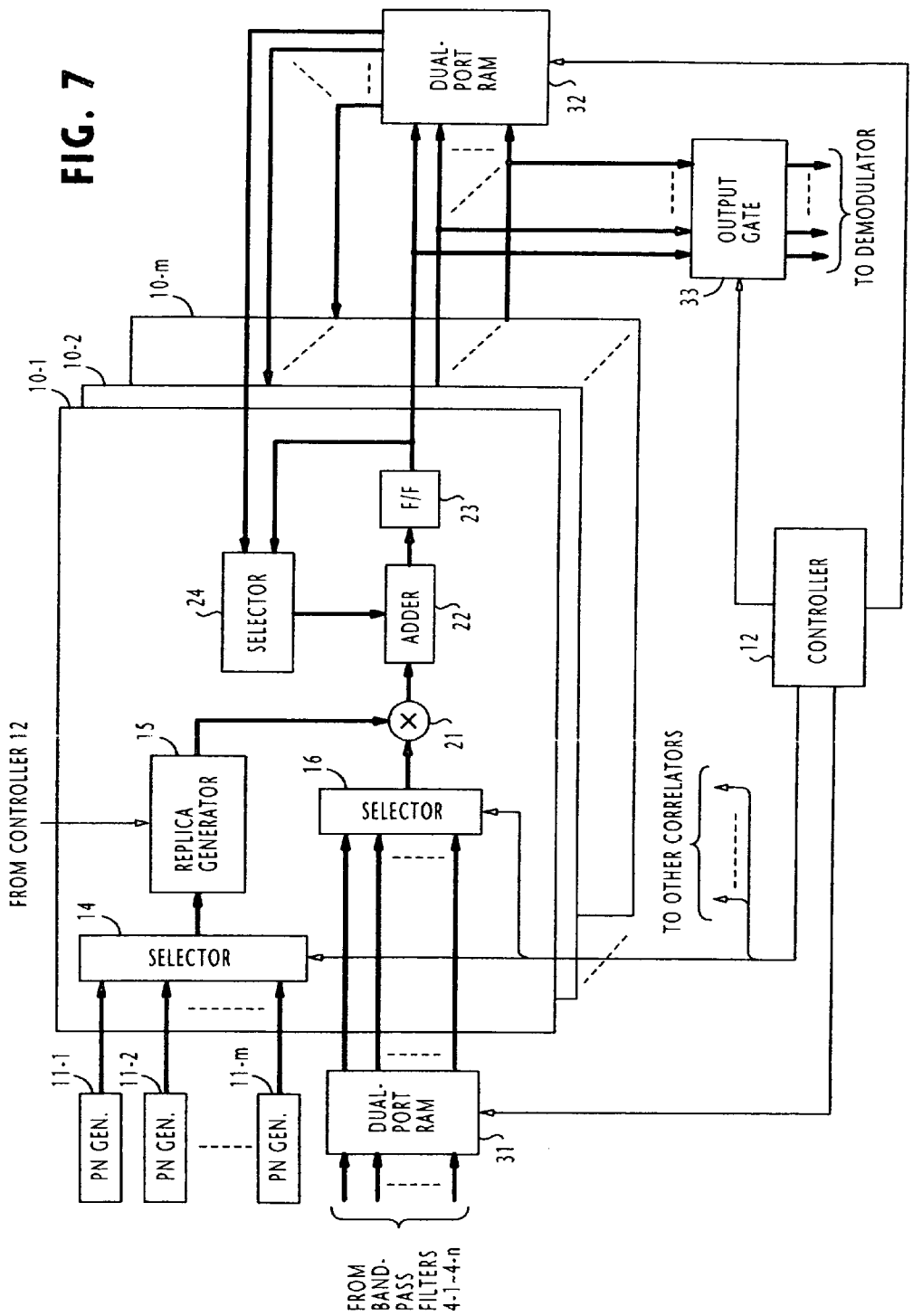
FIG. 7 is a block diagram of the path searcher according to a second embodiment of the present invention.

A second embodiment of the present invention shown in FIG. 7 satisfies this need. In this modification, two dual-port RAMs 31 and 32 are provided respectively on the input and output sides of all correlators 10-1~10-m, as common storage areas. Read-write operations of these memories are controlled by the controller 12.

The output signals of all band-pass filters 4 are supplied to the input RAM 31 and stored in this memory for sixteen consecutive chip intervals. The stored signals are read out of this memory to the selector 16, and one of these signals is selected and coupled to a multiplier 21 of each correlator.

Figure 8:
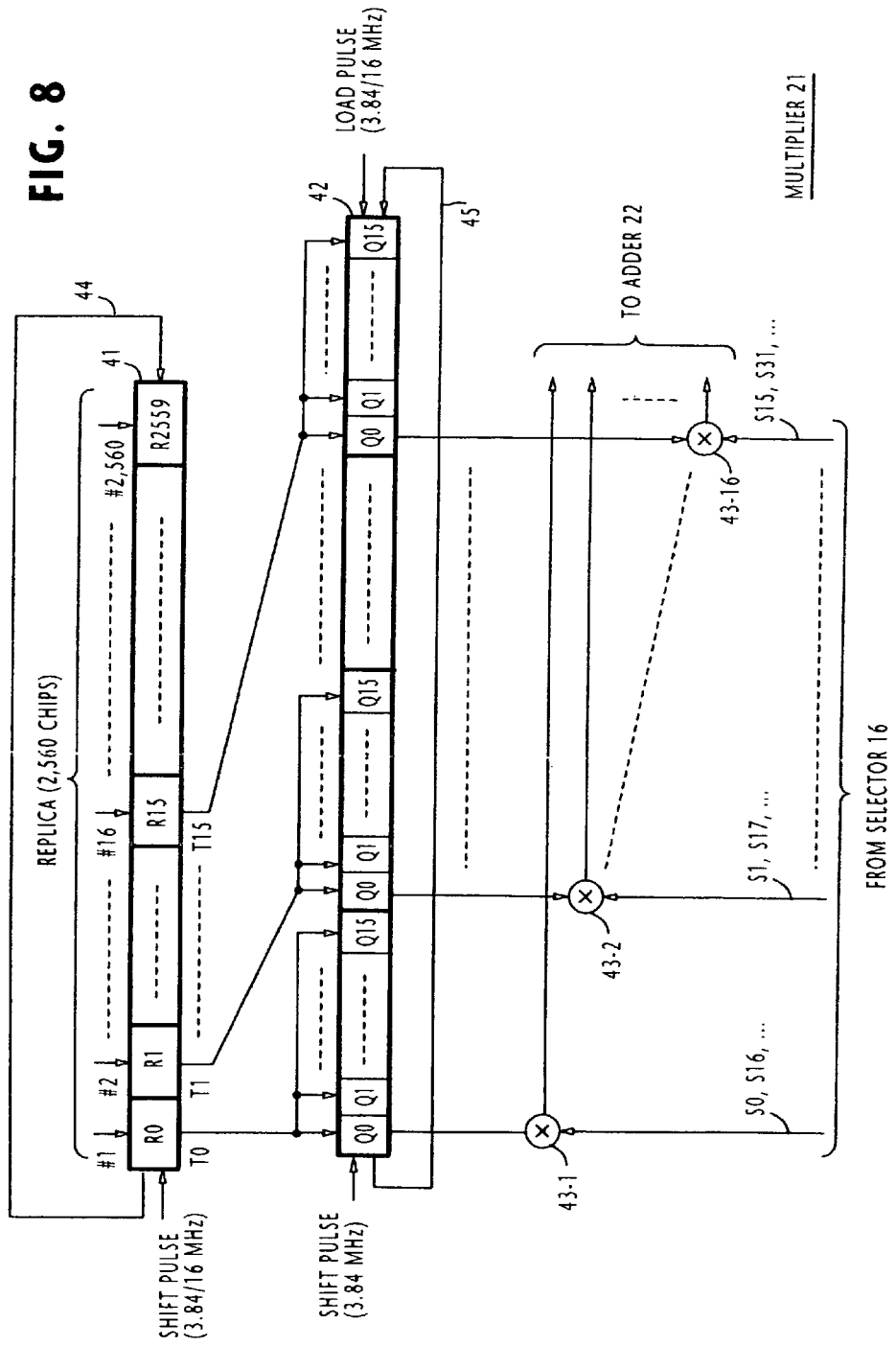
FIG. 8 is a block diagram of the multiplier of FIG. 7.

As shown in detail in FIG. 8, the multiplier 21 is essentially similar to the multiplier 17 of FIG. 3. Multiplier 21 differs in that the shift register 41 is driven at 1/16 of the chip rate 3.84 MHz and the shift register 42 responds to a load pulse which occurs at the same 3.84/16 MHz rate and the stored chips are shifted at the chip rate 3.84 MHz. The sixteen signal chips of RAM 31 are supplied via the selector 16 and applied respectively to the multiplier units 43-1~43-16.

Figure 10:
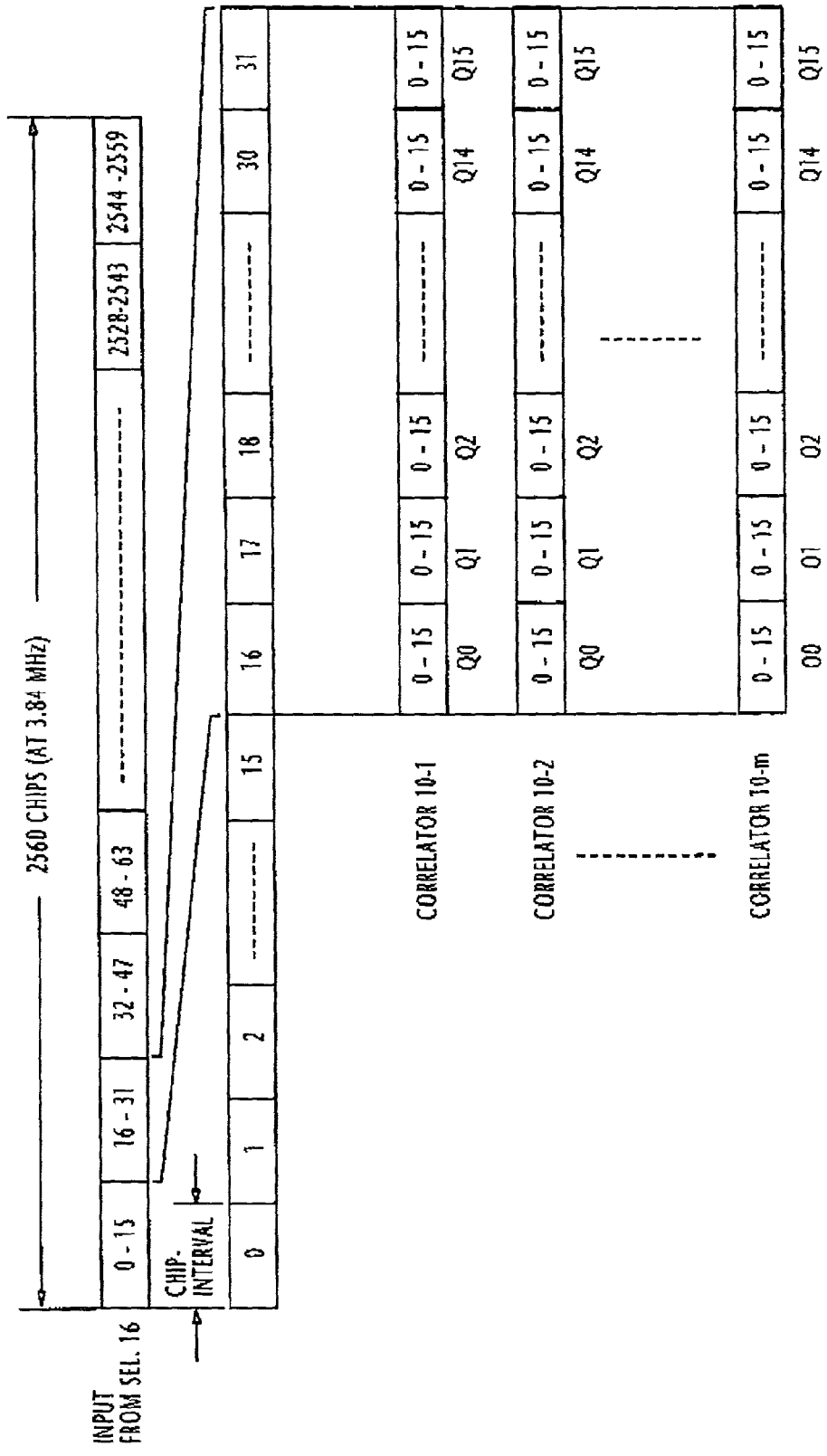
FIG. 10 is a timing diagram of the path searcher of FIG. 7.

The operation of the multiplier of FIG. 8 will be understood with reference to FIGS. 9 and 10 by assuming that signal chips S0 to S15 are supplied to the multiplier units 43-1~43-16 respectively when replica chips #1 through #2,560 chips are stored in stages R0 through R2559. Signal chips S0 to S15 are respectively multiplied by replica chips #1 to #16 of the R0 to R15 stages by multiplying their 16 copies at all the Q0 stages of register 42 during a first chip interval, producing 256 multiplication values. During a second chip interval, the shift register 42 is shifted by one chip position to the left, causing the copies of replica chips #2 to #17 to be shifted from the Q1 stages to the Q0 stages. Signal chips S0 to S14 are therefore multiplied by copies of these chips at the Q0 stages of register 42, producing 256 multiplication values. The process is repeated during subsequent chip interval until the chips S0 to S15 are multiplied respectively by #16 to #31 chips which have been shifted from the Q15 stages to the Q0 stages during the sixteenth chip interval, producing a total of 4,096 multiplication values during the sixteen chip intervals, as shown in FIG. 10.

Figure 11:
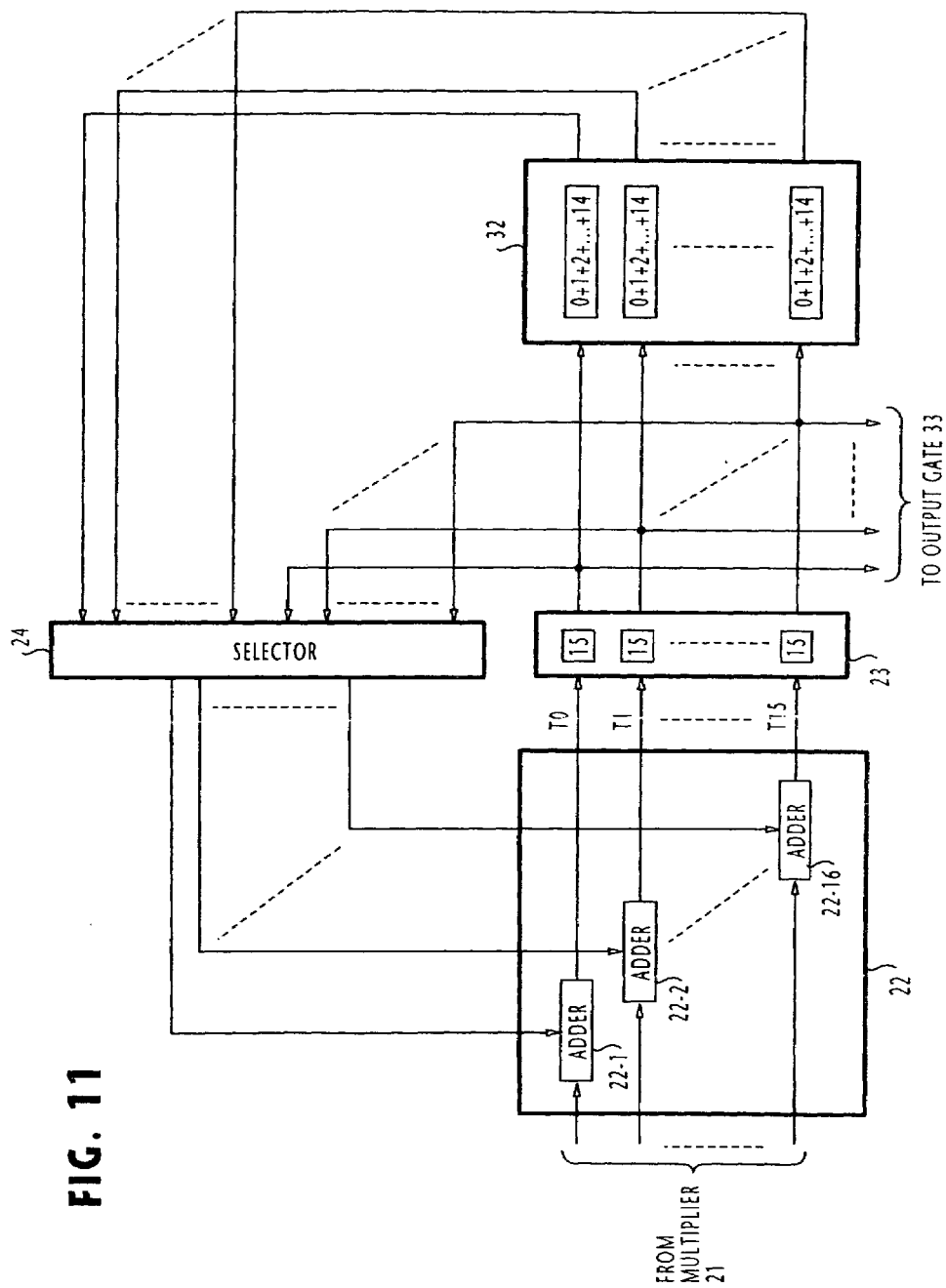
FIG. 11 is a block diagram of the adder of FIG. 7 and the associated circuits.

As shown in detail in FIG. 11, the adder 22 includes a plurality of adder units 22-1 through 22-16 to which the output signals of multiplier 21 are respectively supplied. Output signals of these adder units, which correspond to correlation points T0 to T15, are stored in respective storage locations of a delay memory or flip-flop 23 for an interval corresponding to a multiplying operation. When a subsequent set of new multiplication values are supplied to the adder units 22 from the multiplier 21, the flip-flop 23 supplies the stored values to a selector 24. Selector 24 passes these signals to the adder 22 as previous values, where they are summed with the new values from the multiplier 21. The summed outputs are fed to the flip-flop 23 to update the previous values. The outputs of flip-flop 23 are also supplied to the output RAM 32 and stored in respective storage locations by overwriting previous values. The process continues until the multiplications are repeated fifteen times, so that a total value of the previous fifteen values is stored in a storage location of memory 32 corresponding to each of the correlation points T0 to T15. At the end of sixteenth calculation, the selector 24 switches its paths and the memory 32 is accessed to read the intermediate results of the previous calculations. The outputs of the memory 32 are passed through the switched pats of selector 24 to the adders 22, respectively, where the intermediate results are summed with the final results to produce sixteen correlation values at the outputs of the flip-flop 23.

An output gate 33 is enabled to pass the correlation values obtained in this way to the demodulator 6.

What is claimed is:

1. A path searcher, for a spread spectrum receiver for receiving a spread spectrum signal, wherein:
   the receiver includes a plurality of correlators, wherein each of the correlators produces a replica of a scrambled synchronization code and determines a correlation value between said replica and the received spread spectrum signal;
   the path searcher comprises: a first memory for storing the received spread spectrum signal,
   each of said correlators:
   reads the stored spread spectrum signal from the first memory at a rate higher than a chip rate of said received spread spectrum signal,
   repeatedly performs a correlation operation between the read spread spectrum signal and said replica at said higher rate by successively shifting said replica with respect to said stored spread spectrum signal;
   the path searcher further comprises a second memory for initially storing an intermediate result of a correlation value from each of said correlators and for subsequently reading the stored intermediate result into a corresponding one of said correlators;
   each of said correlators adds the intermediate result from the second memory with a correlation value produced by the correlation operation performed at the end of the chip interval; and
   each of said correlators comprises:
   a multiplier for multiplying the spread spectrum signal read from the first memory and said replica at said higher rate,
   an adder for summing an output signal of the multiplier with a previous value,
   delay means for delaying an output signal of the adder, and
   a selector for supplying the delayed output signal to said adder as said previous value during an initial portion of a chip interval and for supplying the stored intermediate results from said second memory to said adder at the end of the chip interval.

2. A spread spectrum receiver which receives a spread spectrum signal containing a scrambled synchronization code, comprising:
   a plurality of antenna systems for receiving said spread spectrum signal and for producing therefrom a plurality of output signals representing characteristics of a plurality of communication paths;
   a plurality of correlators for receiving the output signals of said antenna systems, each correlator comprising:
   a replica generator for producing a replica of said scrambled synchronization code;
   a multiplier for performing a multiplying operation between said replica and one of said output signals at a rate higher than a chip rate of said spread spectrum signal by successively shifting said replica with respect to the spread spectrum signal;

an adder for summing an output signal of said multiplier with a previous signal;

a memory for storing an output signal of said adder and supplying the stored output signal back to said adder as said previous signal; and wherein said multiplier comprises:

a first shift register for storing said replica and recirculating the stored replica along a series of stages;

a second shift register having a plurality of stages divided into a plurality of groups corresponding respectively to stages of a portion of said first shift register, the stages of each group being connected together to one of the stages of said portion for loading chip data therefrom each time the replica is shifted by one stage in said first shift register and for recirculating the stored chip data along the second shift register; and a plurality of multiplier units associated respectively with said groups of stages of said second shift register, each of said plurality of multipliers being connected to one of the stages of the associated group of stages of the second shift register for multiplying one of the output signals of said antenna systems with the chip data of said second shift register.

3. A spread spectrum receiver which receives a spread spectrum signal containing a scrambled synchronization code, comprising:

a plurality of antenna systems for receiving said spread spectrum signal and for producing therefrom a plurality of output signals representing characteristics of a plurality of communication paths;

a first memory for storing the output signals of said antenna systems for a predetermined length of chip intervals;

a plurality of correlators for receiving one of the stored output signals from said first memory, each correlator comprising:

a replica generator for producing a replica of said scrambled synchronization code;

a multiplier for performing a multiplying operation between said replica and the output signal of said first memory at a rate higher than a chip rate of said spread spectrum signal while successively shifting said replica with respect to said output signal of said first memory;

an adder for summing an output signal of said multiplier with a previous signal;

delay means connected to the output of said adder to produce a delayed output signal; and a selector for initially supplying the delayed output signal repeatedly to said adder as said previous signal to produce an intermediate result of a correlation value at the output of said delay means;

a second memory connected to the output of the delay means of each of said correlators for storing said intermediate result, said selector reading the intermediate result from the second memory into said adder to obtain said correlation value when a final result is obtained at the output of said delay means; and wherein said multiplier comprises:

a first shift register for storing said replica and for recirculating the stored replica along a series of stages;

a second shift register having a plurality of stages divided into a plurality of groups corresponding respectively to stages of a portion of said first shift register, the stages of each group being connected together to one of the stages of said portion for loading chip data therefrom each time the replica is shifted by one stage in said first shift register and for recirculating the loaded chip data along the second shift register; and a plurality of multiplier units, associated respectively with said groups of stages of said second shift register, each of said plurality of multiplier units being connected to one of the stages of the associated group of stages of the second shift register for multiplying a chip stored therein with one of successively arranged parallel chips of the output signal of said first memory.

* * * * *